US010790953B2

(12) United States Patent
Kim et al.

(10) Patent No.: US 10,790,953 B2
(45) Date of Patent: Sep. 29, 2020

(54) METHOD FOR TRANSMITTING AND RECEIVING SIGNALS BETWEEN BASE STATION AND TERMINAL IN WIRELESS COMMUNICATION SYSTEM, AND DEVICE SUPPORTING SAME

(71) Applicant: LG ELECTRONICS INC., Seoul (KR)

(72) Inventors: Kijun Kim, Seoul (KR); Suckchel Yang, Seoul (KR); Joonkui Ahn, Seoul (KR); Eunsun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 97 days.

(21) Appl. No.: 16/072,842

(22) PCT Filed: Feb. 10, 2017

(86) PCT No.: PCT/KR2017/001487
§ 371 (c)(1),
(2) Date: Jul. 25, 2018

(87) PCT Pub. No.: WO2017/138772
PCT Pub. Date: Aug. 17, 2017

(65) Prior Publication Data
US 2019/0036658 A1 Jan. 31, 2019

Related U.S. Application Data

(60) Provisional application No. 62/306,623, filed on Mar. 10, 2016, provisional application No. 62/294,315, filed on Feb. 12, 2016.

(51) Int. Cl.
*H04W 4/00* (2018.01)
*H04L 5/00* (2006.01)
(Continued)

(52) U.S. Cl.
CPC ............ *H04L 5/005* (2013.01); *H04L 5/0055* (2013.01); *H04L 5/1469* (2013.01);
(Continued)

(58) Field of Classification Search
CPC ...................................................... H04L 5/005
See application file for complete search history.

(56) References Cited

U.S. PATENT DOCUMENTS

2006/0098567 A1* 5/2006 Willenegger ....... H04W 72/005
370/206
2013/0051355 A1* 2/2013 Hong ................... H04J 11/0073
370/329

(Continued)

FOREIGN PATENT DOCUMENTS

| KR | 1020140044359 | 4/2014 |
|---|---|---|
| KR | 1020140098100 | 8/2014 |
| KR | 1020150038429 | 4/2015 |

OTHER PUBLICATIONS

PCT International Application No. PCT/KR2017/001487, Written Opinion of the International Searching Authority dated May 16, 2017, 30 pages.

(Continued)

*Primary Examiner* — Guang W Li
(74) *Attorney, Agent, or Firm* — Lee Hong Degerman Kang Waimey

(57) ABSTRACT

Disclosed are a method for transmitting and receiving between a base station (BS) and a terminal in a wireless communication system, and a device supporting the same. Specifically, disclosed are a method for transmitting, by a base station, a plurality of downlink data channels in a subframe according to a time divisional multiplexing (TDM), and operating a terminal in response to the transmission, and a device supporting the same method.

9 Claims, 22 Drawing Sheets

(51) Int. Cl.
   *H04L 5/14* (2006.01)
   *H04W 72/04* (2009.01)
   *H04W 72/12* (2009.01)
   *H04W 72/14* (2009.01)
   *H04W 56/00* (2009.01)

(52) U.S. Cl.
   CPC ... *H04W 72/0406* (2013.01); *H04W 72/1278* (2013.01); *H04W 72/14* (2013.01); *H04L 5/0007* (2013.01); *H04W 56/0015* (2013.01)

(56) References Cited

U.S. PATENT DOCUMENTS

| | | | | |
|---|---|---|---|---|
| 2013/0195065 | A1* | 8/2013 | Park | H04L 1/1861 370/329 |
| 2014/0079036 | A1* | 3/2014 | Montojo | H04W 68/02 370/336 |
| 2014/0321382 | A1* | 10/2014 | Guan | H04W 72/1289 370/329 |
| 2015/0201402 | A1 | 7/2015 | Morioka | |
| 2017/0105206 | A1* | 4/2017 | Maattanen | H04L 5/0037 |
| 2017/0201968 | A1* | 7/2017 | Nam | H04W 72/042 |
| 2017/0208583 | A1* | 7/2017 | Jiang | H04L 5/0055 |
| 2018/0167931 | A1* | 6/2018 | Papasakellariou | H04L 1/1854 |
| 2018/0262304 | A1* | 9/2018 | Wang | H04W 72/1278 |
| 2019/0036658 | A1* | 1/2019 | Kim | H04W 72/0406 |
| 2019/0364543 | A1* | 11/2019 | Ugurlu | H04L 1/1854 |

OTHER PUBLICATIONS

LG Electronics, "Further details on NB-PDSCH design for NB-IoT", 3GPP TSG RAN WG1 Meeting #84, R1-160617, Feb. 2016, 4 pages.

* cited by examiner

Subframe #1

METHOD FOR TRANSMITTING AND RECEIVING SIGNALS BETWEEN BASE STATION AND TERMINAL IN WIRELESS COMMUNICATION SYSTEM, AND DEVICE SUPPORTING SAME

CROSS-REFERENCE TO RELATED APPLICATIONS

This application is the National Stage filing under 35 U.S.C. 371 of International Application No. PCT/KR2017/001487, filed on Feb. 10, 2017, which claims the benefit of U.S. Provisional Application No. 62/294,315, filed on Feb. 12, 2016 and 62/306,623, filed on Mar. 10, 2016, the contents of which are all hereby incorporated by reference herein in their entirety.

TECHNICAL FIELD

The following description relates to a wireless communication system, and more particularly to a method for transmitting and receiving signals between a user equipment (UE) and a base station (BS), and devices for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An object of the present invention devised to solve the problem lies in a method for efficiently transmitting and receiving signals between a base station (BS) and a user equipment (UE).

In particular, it is an object of the present invention to provide a method for allowing a base station (BS) to transmit a plurality of DL data channels using a Time Division Multiplexing (TDM) scheme within a single subframe, and a method for operating a user equipment (UE) in response to the transmitted DL data channels.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

The present invention provides a method and apparatuses for transmitting and receiving signals between a user equipment (UE) and a base station (BS) in a wireless communication system.

In accordance with one aspect of the present invention, a method for transmitting and receiving signals to and from at least one user equipment (UE) by a base station (BS) in a wireless communication system includes transmitting a downlink (DL) control channel and a plurality of downlink (DL) data channels in a single subframe, wherein the plurality of DL data channels is TDM (Time Division Multiplexing)-transmitted.

In accordance with another aspect of the present invention, a base station (BS) for transmitting and receiving signals to and from at least one user equipment (UE) in a wireless communication system includes a transmitter, a receiver, and a processor. configured to operate by connecting to the transmitter and the receiver. The processor may transmit a downlink (DL) control channel and a plurality of downlink (DL) data channels in a single subframe. The plurality of DL data channels is TDM (Time Division Multiplexing)-transmitted.

The DL control channel may be transmitted earlier than the plurality of DL data channels in a time domain.

Some parts of the plurality of DL data channels may be transmitted from a specific time where the DL control channel is transmitted.

The number of the DL control channels may be a plural number, and the plurality of DL control channels may correspond to the plurality of DL data channels, respectively.

The single subframe may include two slots, and the DL control channel and the DL data channel corresponding to each other may be transmitted in the same slot.

A demodulation-reference signal (DM-RS) for the DL control channel and a demodulation-reference signal (DM-RS) for the plurality of DL data channels may be shared.

A demodulation-reference signal (DM-RS) for the DL control channel and a demodulation-reference signal (DM-RS) for the plurality of DL data channels may be transmitted individually.

The method may further include receiving a reception (Rx) acknowledgement (ACK) response to a single DL data channel from among the plurality of DL data channels, wherein the reception (Rx) acknowledgement (ACK) response is transmitted either in the subframe or in a subframe subsequent to the subframe on the basis of a specific time where transmission of the single DL data channel is ended.

The subframe may include 14 symbols. When transmission of the single DL data channel is ended before or at a K-th symbol (K being a natural number) from among the 14 symbols, the reception (Rx) acknowledgement (ACK) response may be transmitted in the subframe.

The subframe may include 14 symbols. When transmission of the single DL data channel is ended after a K-th symbol (K being a natural number) from among the 14 symbols, the reception (Rx) acknowledgement (ACK) response may be transmitted in a subframe subsequent to the subframe.

In accordance with another aspect of the present invention, a method for transmitting and receiving signals to and from at least one base station (BS) by a user equipment (UE) in a wireless communication system includes receiving a downlink (DL) control channel and a downlink (DL) data channel corresponding to the downlink (DL) control channel in a single subframe, and transmitting a reception (Rx) acknowledgement (ACK) response to the DL data channel. The reception (Rx) acknowledgement (ACK) response is transmitted either in the subframe or in a subframe subsequent to the subframe on the basis of a specific time where transmission of the DL data channel is ended.

In accordance with another aspect of the present invention, a user equipment (UE) for transmitting and receiving signals to and from a base station (BS) in a wireless communication system includes a transmitter, a receiver, and a processor configured to operate by connecting to the transmitter and the receiver. The processor may receive a downlink (DL) control channel and a downlink (DL) data channel corresponding to the downlink (DL) control channel in a single subframe, and may transmit a reception (Rx) acknowledgement (ACK) response to the DL data channel. The reception (Rx) acknowledgement (ACK) response is transmitted either in the subframe or in a subframe subsequent to the subframe on the basis of a specific time where transmission of the DL data channel is ended.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

According to the embodiments of the present invention, the base station (BS) may change the direction of a beam to be transmitted to a plurality of UEs within a single subframe, such that the base station (BS) may transmit a downlink (DL) data channel to the plurality of UEs in different beam directions. For this purpose, the base station (BS) may transmit the DL data channel using TDM/FDM schemes.

When the DL data channel and the UL control channel are transmitted and received through the single subframe, the UE may transmit a reception (Rx) acknowledgement (ACK) response to the DL data channel through the single subframe according to a transmission (Tx) end point of the DL data channel through the single subframe. As a result, DL-UL timing spacing can be reduced, and scheduling delay can also be reduced.

The effects that can be achieved through the embodiments of the present invention are not limited to what has been particularly described hereinabove and other effects which are not described herein can be derived by those skilled in the art from the following detailed description. That is, it should be noted that the effects which are not intended by the present invention can be derived by those skilled in the art from the embodiments of the present invention.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

BEST MODE

Figure 1:
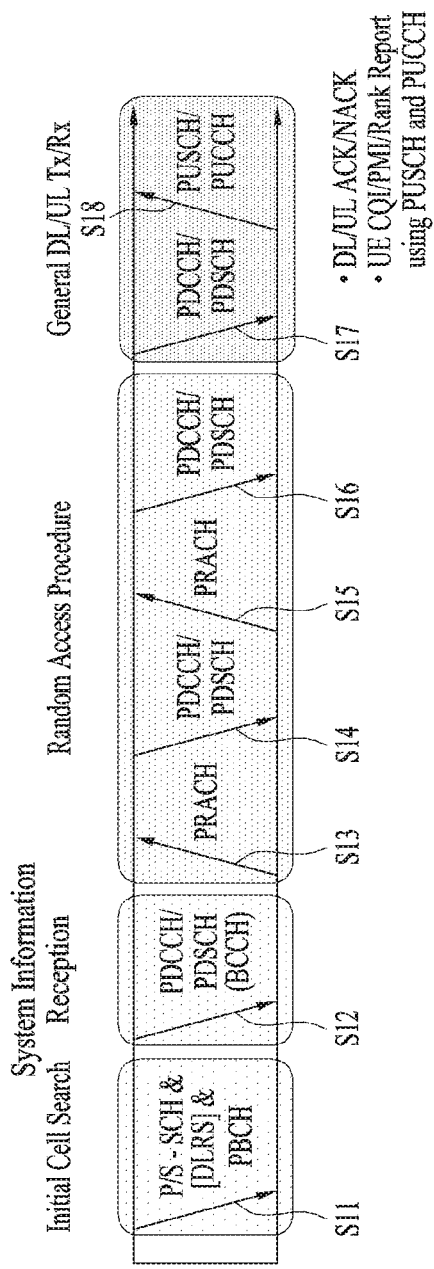
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
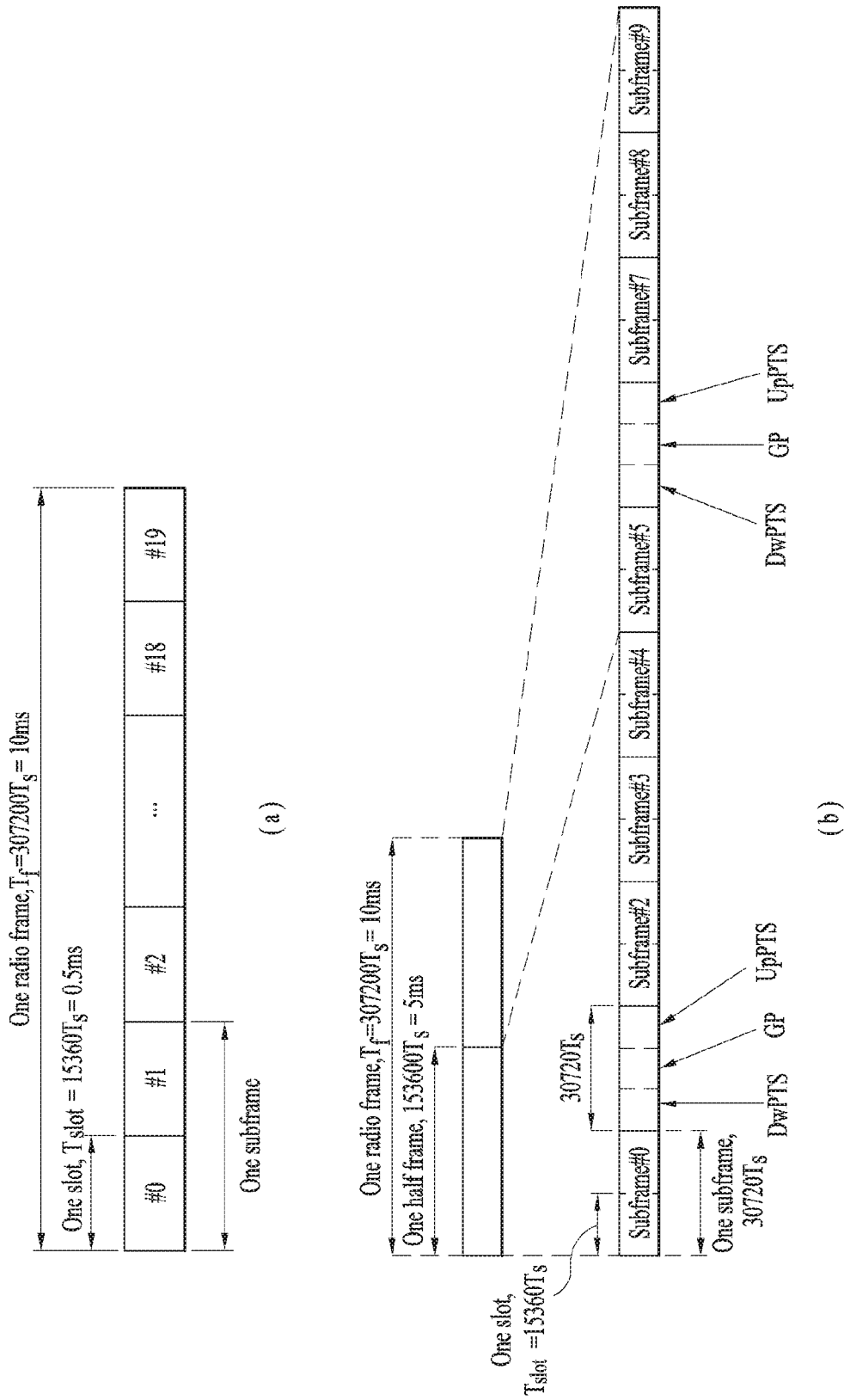
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms ($T_f=307200 \cdot T_s$) long, including equal-sized 20 slots indexed from 0 to 19. Each slot is 0.5 ms ($T_{slot}=15360 \cdot T_s$) long. One subframe includes two successive slots. An ith subframe includes 2ith and (2i+1)th slots. That is, a radio frame includes 10 subframes. A time required for transmitting one subframe is defined as a Transmission Time Interval (TTI). $T_s$ is a sampling time given as $T_s=1/(15 \text{ kHz} \times 2048)=3.2552 \times 10^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f=307200 \cdot T_s$) long, including two half-frames each having a length of 5 ms ($=153600 \cdot T_s$) long. Each half-frame includes five subframes each being 1 ms ($=30720 \cdot T_s$) long. An ith subframe includes 2ith and (2i+1)th slots each having a length of 0.5 ms ($T_{slot}=15360 \cdot T_s$). $T_s$ is a sampling time given as $T_s=1/(15 \text{ kHz} \times 2048)=3.2552 \times 10^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 3:
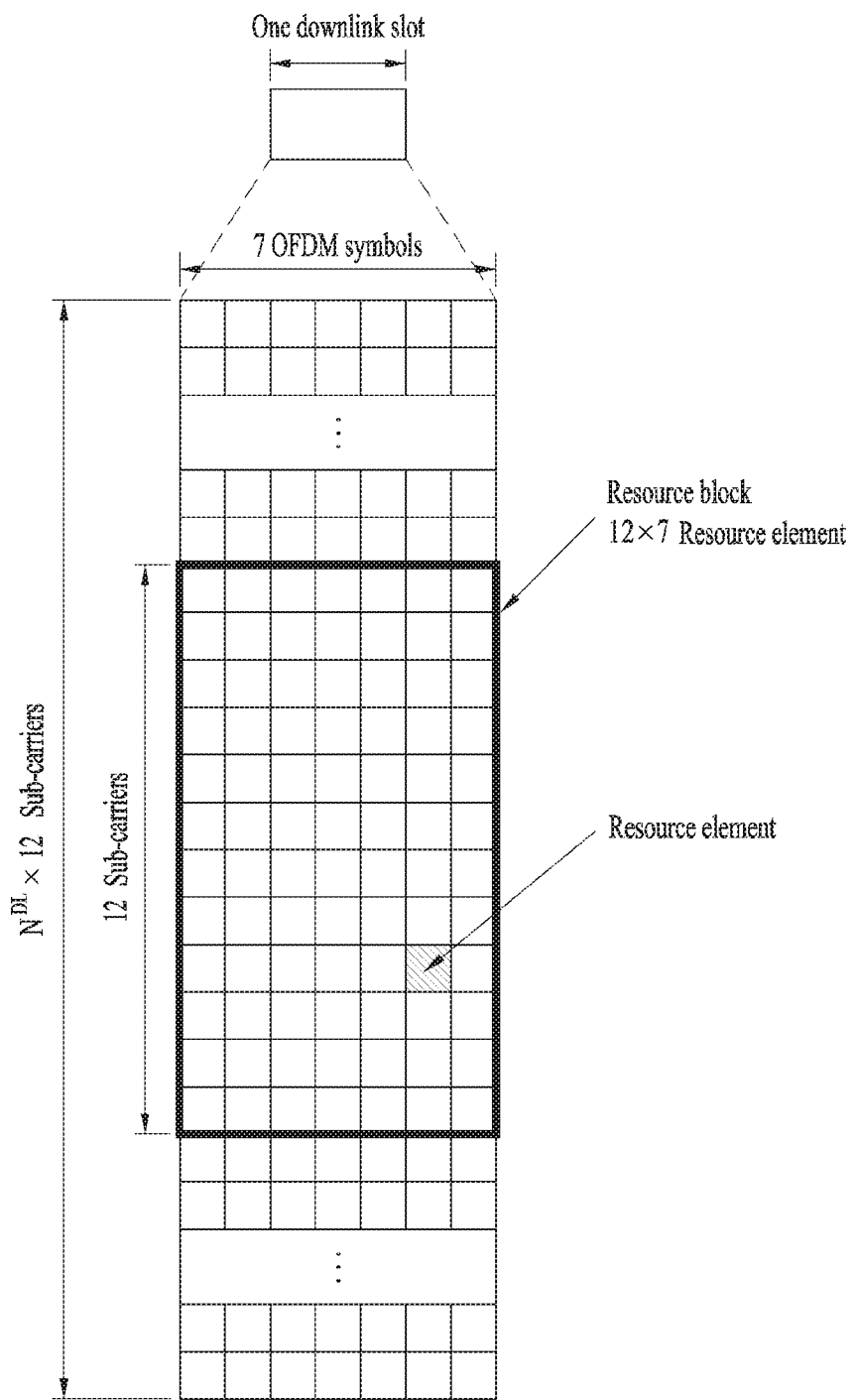
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. The structure of the uplink slot may be the same as the structure of the downlink slot.

Figure 4:
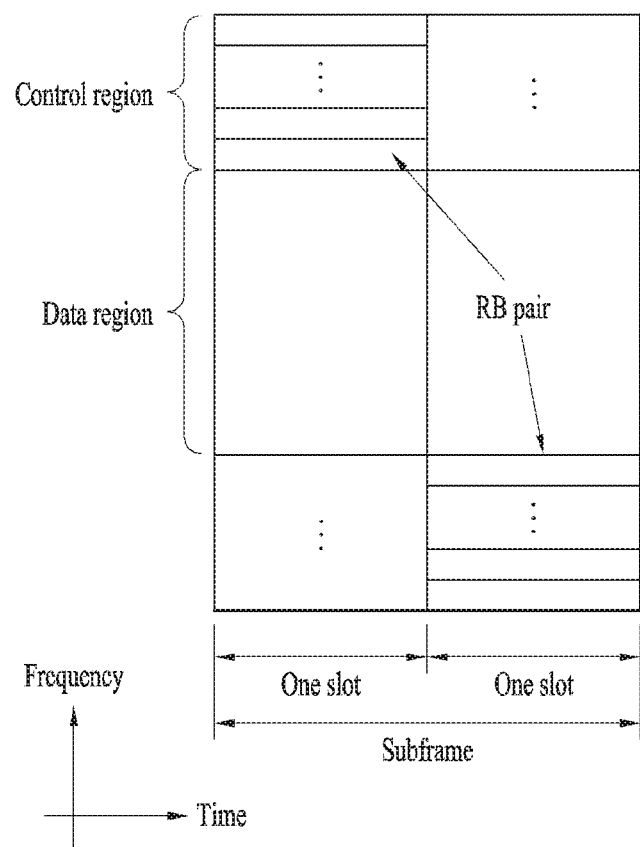
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
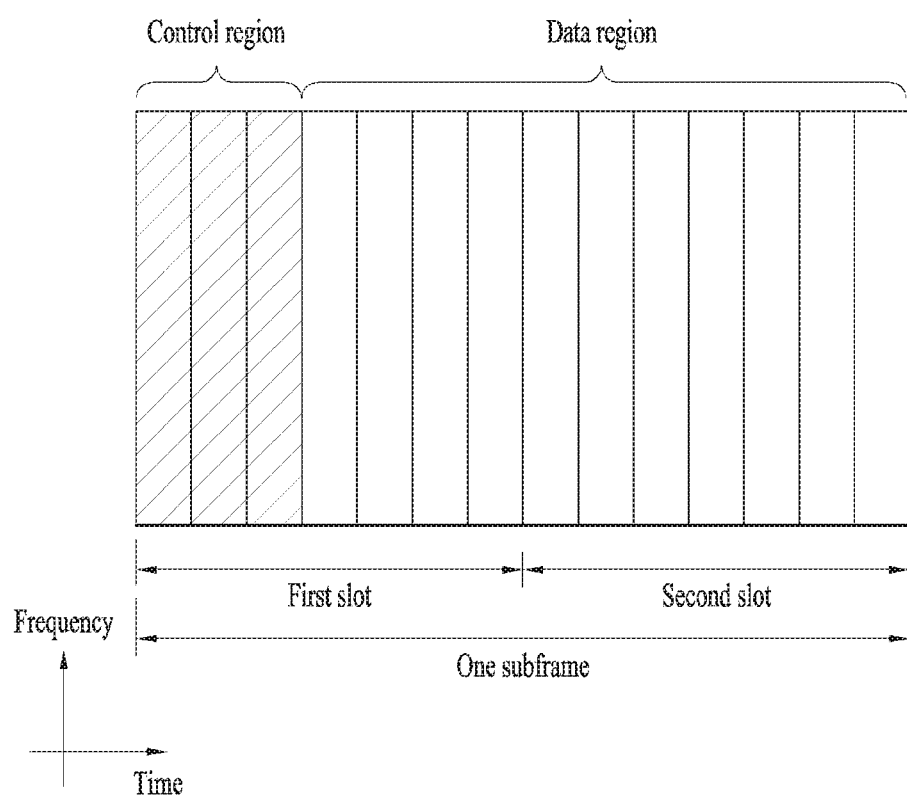
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. New Radio Access Technology System

As more and more communication devices require greater communication capacity, there is a need for mobile broadband communication enhanced over existing radio access technology (RAT). Massive Machine-Type Communications (MTC), which provides a variety of services by connecting multiple devices and objects anywhere and anytime, is also considered. In addition, communication system design considering services/UEs sensitive to reliability and latency is also under discussion.

Thus, introduction of a new radio access technology considering enhanced mobile broadband communication, massive MTC, and Ultra-Reliable and Low Latency Communication (URLLC) is being discussed. In the present invention, for simplicity, this technology will be referred to as New RAT.

2.1. Self-Contained Subframe Structure

Figure 6:
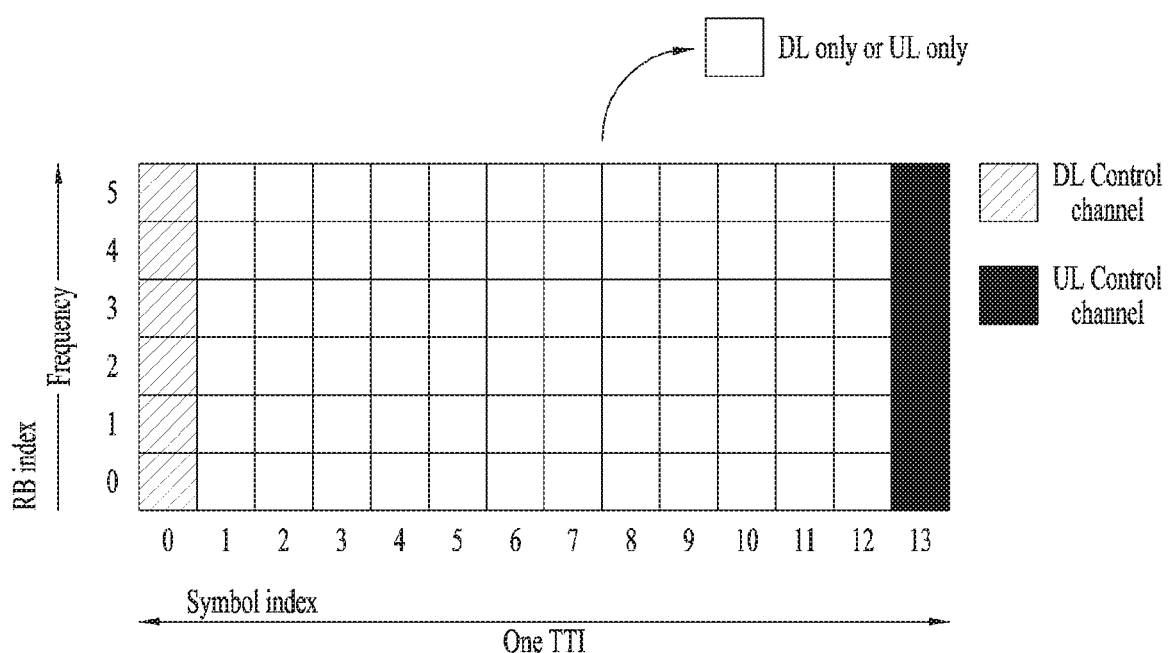
FIG. 6 is a diagram illustrating a self-contained subframe structure applicable to the present invention.

FIG. 6 is a diagram illustrating a self-contained subframe structure applicable to the present invention.

In the New RAT system to which the present invention is applicable, a self-contained subframe structure as shown in FIG. 6 is proposed in order to minimize data transmission latency in the TDD system.

In FIG. 6, the hatched region (e.g., symbol index=0) represents a downlink control region, and the black region (e.g., symbol index=13) represents an uplink control region. The other region (e.g., symbol index=1 to 12) may be used for downlink data transmission or for uplink data transmission.

In this structure, DL transmission and UL transmission may be sequentially performed in one subframe. In addition, DL data may be transmitted and received in one subframe and UL ACK/NACK therefor may be transmitted and received in the same subframe. As a result, this structure may reduce time taken to retransmit data when a data transmission error occurs, thereby minimizing the latency of final data transmission.

In such a self-contained subframe structure, a time gap having a certain time length is required in order for the base station and the UE to switch from the transmission mode to the reception mode or from the reception mode to the transmission mode. To this end, some OFDM symbols at the time of switching from DL to UL in the self-contained subframe structure may be set as a guard period (GP).

While a case where the self-contained subframe structure includes both the DL control region and the UL control region has been described above, the control regions may be selectively included in the self-contained subframe structure. In other words, the self-contained subframe structure according to the present invention may include not only the case of including both the DL control region and the UL control region but also the case of including either the DL control region or the UL control region alone as shown in FIG. 6.

2.2. OFDM Numerology

The New RAT system uses the OFDM transmission scheme or a similar transmission scheme. Here, the New RAT system may typically have the OFDM numerology as shown in Table 2.

TABLE 2

| Parameter | Value |
| --- | --- |
| Subcarrier-spacing (Δf) | 75 kHz |
| OFDM symbol length | 13.33 μs |
| Cyclic Prefix(CP) length | 1.04 us/0.94 μs |
| System BW | 100 MHz |
| No. of available subcarriers | 1200 |
| Subframe length | 0.2 ms |
| Number of OFDM symbol per Subframe | 14 symbols |

Alternatively, the New RAT system may use the OFDM transmission scheme or a similar transmission scheme, and may use an OFDM numerology selected from among multiple OFDM numerologies as shown in Table 3. Specifically, as disclosed in Table 3, the New RAT system may take the 15 kHz subcarrier-spacing used in the LTE system as a base, and use an OFDM numerology having subcarrier-spacing of 30, 60, and 120 kHz, which are multiples of the 15 kHz subcarrier-spacing.

In this case, the cyclic prefix, the system bandwidth (BW) and the number of available subcarriers disclosed in Table 3 are merely an example that is applicable to the New RAT system according to the present invention, and the values thereof may vary depending on the implementation method. Typically, for the 60 kHz subcarrier-spacing, the system bandwidth may be set to 100 MHz. In this case, the number of available subcarriers may be greater than 1500 and less than 1666. Also, the subframe length and the number of OFDM symbols per subframe disclosed in Table 3 are merely an example that is applicable to the New RAT system according to the present invention, and the values thereof may vary depending on the implementation method.

TABLE 3

| Parameter | Value | Value | Value | Value |
| --- | --- | --- | --- | --- |
| Subcarrier-spacing (Δf) | 15 kHz | 30 kHz | 60 kHz | 120 kHz |
| OFDM symbol length | 66.66 | 33.33 | 16.66 | 8.33 |
| Cyclic Prefix (CP) length | 5.20 μs/ 4.69 μs | 2.60 μs/ 2.34 μs | 1.30 μs/ 1.17 μs | 0.65 μs/ 0.59 μs |
| System BW | 20 MHz | 40 MHz | 80 MHz | 160 MHz |
| No. of available subcarriers | 1200 | 1200 | 1200 | 1200 |
| Subframe length | 1 ms | 0.5 ms | 0.25 ms | 0.125 ms |
| Number of OFDM symbol per Subframe | 14 symbols | 14 symbols | 14 symbols | 14 symbols |

2.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

3. Proposed Embodiment

As described above, when analog (or hybrid) beamforming is used with millimeter waves (mmW), signals can be transmitted only in one beam direction (or in a small number of beam directions) at one time point. Therefore, when analog (or hybrid)beamforming is used, only some UEs located in the corresponding beam direction may receive associated services. Due to the above characteristics, the necessity of providing small packet data such as VoIP in the millimeter wave (mmW) band is gradually increasing.

For the above reasons, the present invention provides a method for TDM- or FDM-processing a single subframe so as to transmit/receive a signal that includes DL control information, DL data, and/or UL data.

3.1. Method for Transmitting DL/UL Signals Proposed by the Present Invention 3.1.1. First Scheme FIG. 7 is a conceptual diagram illustrating a method for transmitting DL/UL signals according to a first scheme of the present invention.

Figure 7:
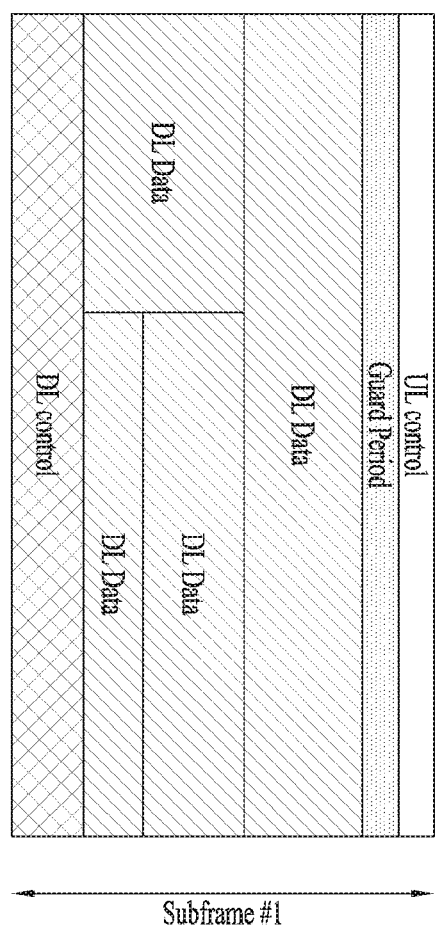
FIG. 7 is a conceptual diagram illustrating a method for transmitting DL/UL signals according to a first scheme of the present invention.

Referring to FIG. 7, according to the self-contained subframe structure of FIG. 6, a control channel (e.g., PDCCH) may be located in a front region of the time domain, and a DL data channel (e.g., PDSCH) resource region may be FDM/TDM-transmitted. In this case, a maximum number of PDSCHs transmitted in each OFDM symbol of the PDSCH resource region may be decided by independent beamforming (BF) capability of the base station (BS). In FIG. 7, it is assumed that the BS may simultaneously have a maximum of two BF capabilities. Therefore, the number of PDSCHs transmitted in each OFDM symbol is set to a maximum of 2, such that the divided data resource regions may be scheduled as shown in FIG. 7.

In the following description, a method for allowing a control channel region to be located at a constant OFDM symbol as shown in FIG. 7, and allowing a data channel region to be FDM/TDM-transmitted will hereinafter be referred to as a DL signal transmission method based on a first scheme of the present invention, or as a first scheme (Scheme 1) for convenience of description and better understanding of the present invention. Through the above-mentioned method, the BS may apply independent beam directions to individual resource regions that are TDM- or TDM/FDM-processed, such that the BS may transmit signals corresponding to the independent beam directions to the plurality of UEs.

The above-mentioned data resource region division method may be applied to perform FDM/TDM division of UL (data) resources even in the case where the corresponding subframe is used for UL data transmission. However, according to the first scheme (Scheme 1), it may be difficult to apply proper beam directions to respective UEs as well as to transmit signals corresponding to the respective beam directions to the respective UEs. In this case, control information (or a control region, preferably PDCCH) may be transmitted with a wide beam pattern.

3.1.2. Second Scheme

Figure 8:
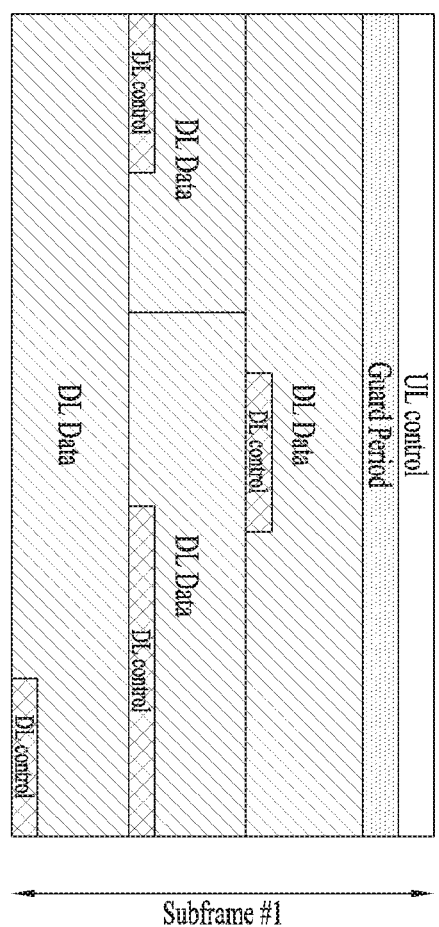
FIG. 8 is a conceptual diagram illustrating a method for transmitting DL/UL signals according to a second scheme of the present invention.

FIG. 8 is a conceptual diagram illustrating a method for transmitting DL/UL signals according to a second scheme of the present invention.

Referring to FIG. 8, an analog (or hybrid) beamforming base station (BS) may perform beamforming of a control channel (e.g., PDCCH) together with a data channel (e.g., PDSCH), and may transmit the beamforming resultant channels. For this purpose, a DL resource region within the single subframe may be time-divided into a plurality of short transmission time intervals (sTTIs), and control information and data may be transmitted per sTTI unit.

The example of FIG. 8 may be appreciated as an example in which a resource region composed of 12 OFDM symbols is time-divided into three sTTIs, and each sTTI is composed of 4 OFDM symbols. In another example, the example of FIG. 8 may also be appreciated as an example in which a short transmission time interval (sTTI) is configured as an OFDM symbol duration and data is transmitted across multiple sTTIs. In this case, data transmission shown in FIG. 8 may be appreciated as an example in which data is transmitted across 4 STTIs.

Differently from the above-mentioned Scheme 1 (or First Scheme), the number of control channels (e.g., PDCCHs) capable of being simultaneously transmitted according to the transmission method of FIG. 8 may be restricted by BF capability of the BS. Thus, the control channel of FIG. 8 may be FDM/TDM-transmitted in the same manner as in the data channel. In the following description, a method for allowing a control channel region and a data channel region to be FDM/TDM-transmitted as shown in FIG. 8 will hereinafter be referred to as a DL signal transmission method based on a second scheme of the present invention, or as a second scheme (Scheme 2) for convenience of description and better understanding of the present invention.

According to Scheme 2, the data channel and the control channel are simultaneously beamformed and transmitted, such that transmission efficiency can be increased. In addition, a control channel including UL grant control information may be directed (or targeted) to a UE scheduled to receive the corresponding information, and may be beamformed and transmitted in the corresponding direction. However, since there is a possibility that control information is transmitted across the entire data region, complexity generated when the UE performs blind decoding (BD) of a control channel may unavoidably increase.

3.1.3. Third Scheme

Figure 9:
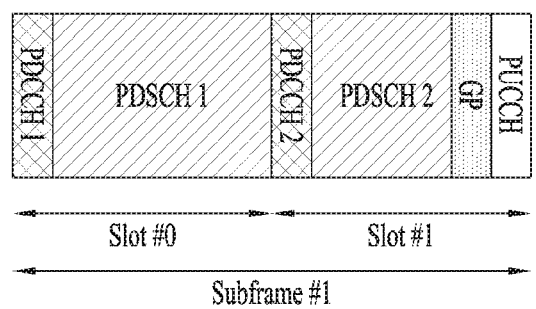
FIGS. 9 to 11 illustrate structures in which DL control information and data are TDM/FDM-transmitted according to one example of the present invention.
Figure 10:
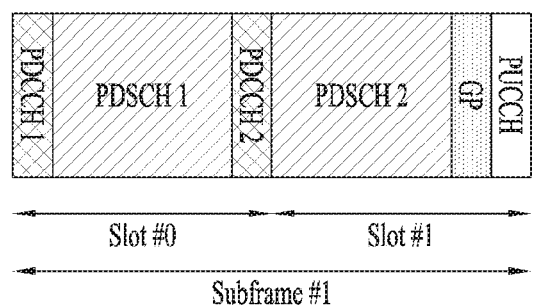
Figure 11:
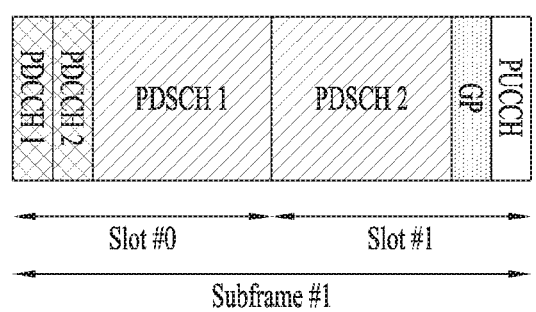

FIGS. 9 to 11 illustrate structures in which DL control information and data are TDM/FDM-processed and transmitted according to one example of the present invention.

For example, as shown in FIG. 9, a DL resource region of the single subframe may be time-divided into two sTTIs, and control information and data may be transmitted per sTTI unit. In this case, PDCCH may be located at a first OFDM symbol of each slot.

In another example, as shown in FIG. 10, a DL resource region of a single subframe may be divided into two sTTIs, and PDCCH2 may be located at the last OFDM symbol of a first slot such that PDSCH transmission regions of the respective sTTIs can be adjusted to be equal to one another.

As shown in FIG. 11, a DL resource region of a single subframe may be divided into two sTTIs, and PDCCH for transmitting scheduling DCI for each PDSCH may be located at the front OFDM symbol in the time domain of the above subframe.

In FIG. 11, PDCCH1 may be used to transmit scheduling DCI about PDSCH1, and PDCCH2 may be used to transmit scheduling DCI about PDSCH2. Subsequently, PDCCHx (where, x=1, 2) and PDSCHx (where, x=1, 2) may be beamformed and transmitted in the same direction, and PDCCH1 and PDCCH2 may be TDM-transmitted such that PDCCH1 and PDCCH2 can be beamformed and transmitted in different directions.

3.1.4. Fourth Scheme

Figure 12:
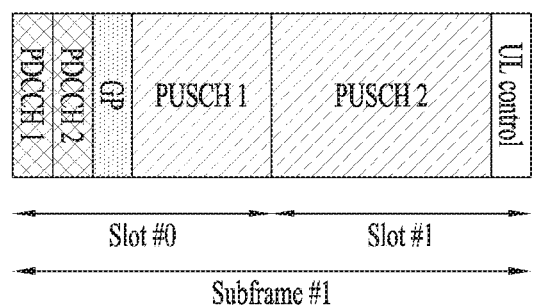
FIGS. 12 and 13 illustrates structures in which DL control information and UL data are TDM/FDM-transmitted according to one example of the present invention.
Figure 13:
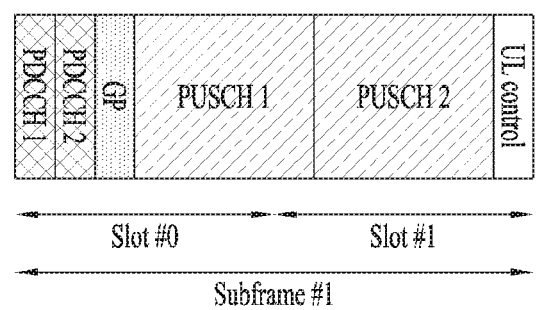

FIGS. 12 and 13 illustrates structures in which DL control information and UL data are TDM/FDM-processed and transmitted according to one example of the present invention.

Referring to FIGS. 12 and 13, a UL resource region of a single subframe may be divided into two sTTIs, and PDCCH for transmitting grant DCI corresponding to each PUSCH may be located at the front OFDM symbol in the time domain of the above subframe.

In FIGS. 12 and 13, PDCCH1 may be used to transmit grant DCI about PUSCH1, and PDCCH2 may be used to transmit grant DCI about PUSCH2.

In this case, a boundary between sTTIs may be identical to a boundary between slots as shown in FIG. 12, or may not be identical to the boundary between slots such that PUSCH Tx regions of the respective sTTIs can be adjusted to be identical to one another.

Detailed structures of the above-mentioned first to fourth schemes will hereinafter be described.

3.2. PDSCH Resource Allocation Pattern

PDSCH resource allocation according to the present invention may be classified into the following five schemes according to flexibility levels. In this case, examples of the respective schemes are respectively shown in FIGS. 14 to 18.

Figure 14:
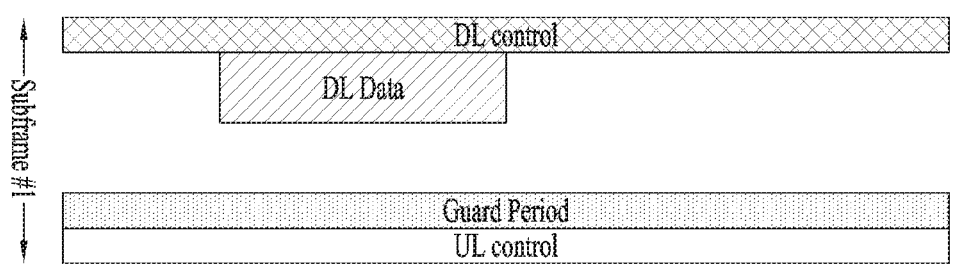
FIG. 14 is a conceptual diagram illustrating an example in which a data resource region is allocated to contiguous time resources and contiguous frequency resources according to an embodiment of the present invention.

FIG. 14 is a conceptual diagram illustrating an example in which a data resource region is allocated to contiguous time resources and contiguous frequency resources according to an embodiment of the present invention.

Figure 15:
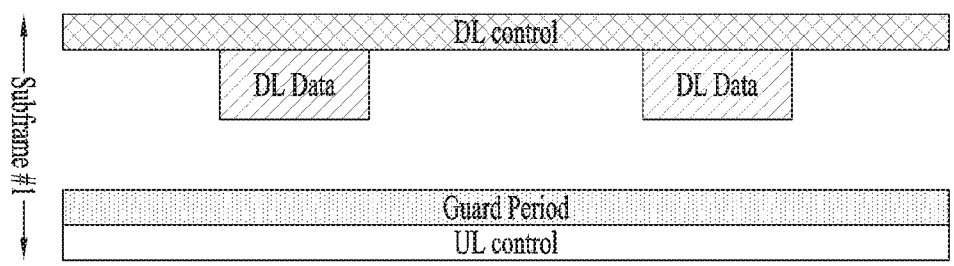
FIG. 15 is a conceptual diagram illustrating an example in which a data resource region is allocated to contiguous time resources and non-contiguous frequency resources according to an embodiment of the present invention.

FIG. 15 is a conceptual diagram illustrating an example in which a data resource region is allocated to contiguous time resources and non-contiguous frequency resources according to an embodiment of the present invention.

Figure 16:
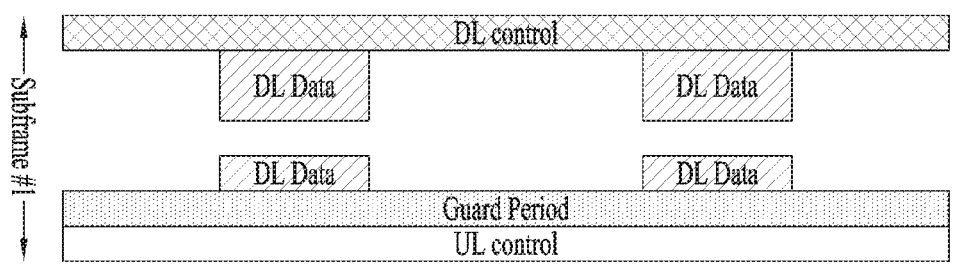
FIG. 16 is a conceptual diagram illustrating an example in which a data resource region is allocated to non-contiguous time resources and non-contiguous frequency resources according to an embodiment of the present invention.

FIG. 16 is a conceptual diagram illustrating an example in which a data resource region is allocated to non-contiguous time resources and non-contiguous frequency resources according to an embodiment of the present invention.

Figure 17:
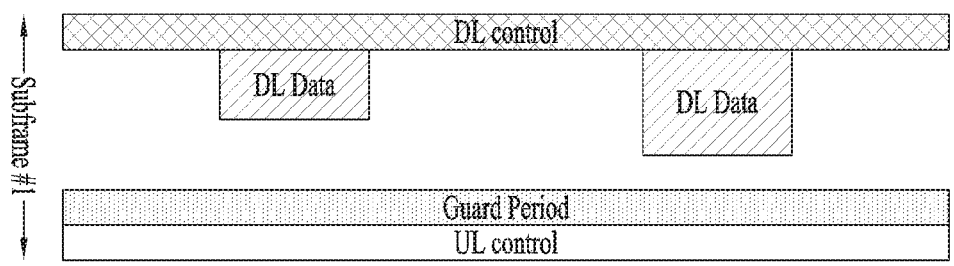
FIG. 17 is a conceptual diagram illustrating an example in which a data resource region is allocated to contiguous time resources in association with specific frequency resources, whereas the data resource region is allocated to non-contiguous frequency resources according to an embodiment of the present invention.

FIG. 17 is a conceptual diagram illustrating an example in which a data resource region is allocated to contiguous time resources in association with specific frequency resources, whereas the data resource region is allocated to non-contiguous frequency resources according to an embodiment of the present invention.

Figure 18:
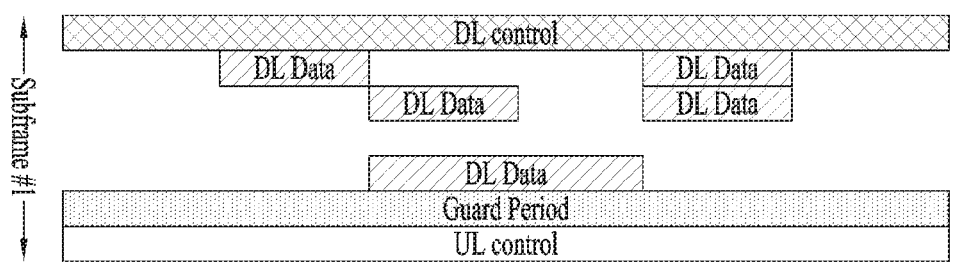
FIG. 18 is a conceptual diagram illustrating an example in which a data resource region is allocated to a frequency resource per unit of time resources according to an embodiment of the present invention.

FIG. 18 is a conceptual diagram illustrating an example in which a data resource region is allocated to a frequency resource per unit of time resources according to an embodiment of the present invention.

3.3. PDSCH Resource Allocation Signaling Method

For PDSCH resource allocation, it is necessary to divide or sort a resource region into a plurality of base resource units. In this case, each of the base resource units will hereinafter be referred to as a resource block (RB). As can be seen from FIGS. 19 to 21 to be described later, an RB may be defined to correspond to resource elements (REs) at a subband composed of contiguous subcarriers, during the sTTI duration. In this case, an RB index (or indexing) may be decided by a combination of the subTTI (or sTTI) index and the subband index. In addition, the base station (BS) may perform signaling of an RB index bitmap allocated through downlink control information (DCI) of a PDCCH, such that the BS may inform the UE of the allocated PDSCH resources. In the present invention, the following three schemes may be used as RB index (or indexing) methods.

Figure 19:
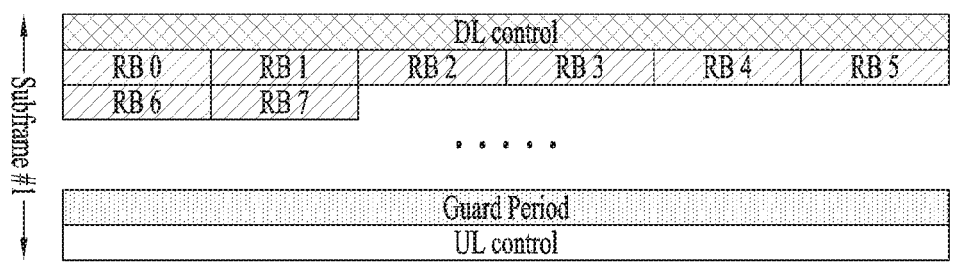
FIG. 19 is a conceptual diagram illustrating a frequency-priority resource block (RB) indexing method according to an embodiment of the present invention.

FIG. 19 is a conceptual diagram illustrating a frequency-priority resource block (RB) indexing method according to an embodiment of the present invention.

Figure 20:
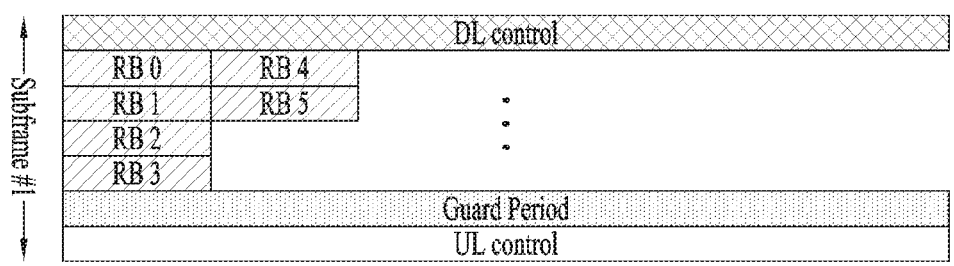
FIG. 20 is a conceptual diagram illustrating a time-priority RB indexing method according to an embodiment of the present invention.

FIG. 20 is a conceptual diagram illustrating a time-priority RB indexing method according to an embodiment of the present invention.

Figure 21:
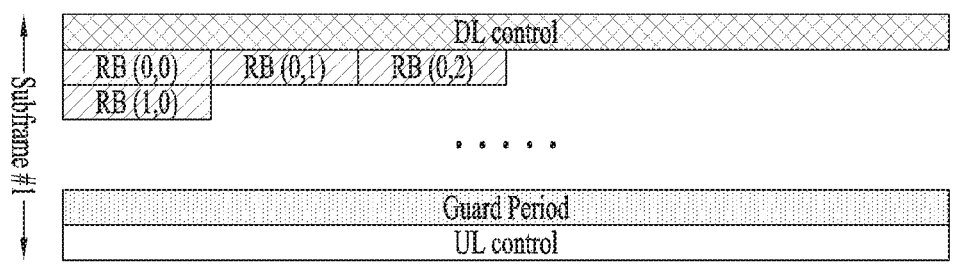
FIG. 21 is a conceptual diagram illustrating a two-dimensional (2D) RB indexing method according to an embodiment of the present invention.

FIG. 21 is a conceptual diagram illustrating a two-dimensional (2D) RB indexing method according to an embodiment of the present invention.

The above-mentioned signaling method can be signaled for all resource allocation schemes illustrated in FIGS. 14 to 18, but there is a disadvantage in that signaling overhead unavoidably increases.

To compensate for the above signaling method, a method for allowing the BS to perform signaling of the allocated subTTI index bitmap and the subband index bitmap through DCI may be used. In accordance with the above method, it is possible to perform signaling for the resource allocation schemes shown in FIGS. 14 to 16, such that signaling overhead can be reduced.

In a modified example of the above method, a method for allowing the BS to perform signaling of the subTTI index bitmap allocated through DCI may be used, or a method for allowing the BS to perform signaling of the subband index bitmap either for each allocated subTTI or for each OFDM symbol may be used. Although the aforementioned modified example requires signaling of at least two bitmaps, there is an advantage in that signaling of the resource allocation scheme of FIG. 18 is possible.

In another modified example, the BS may use a method for allowing the BS to perform signaling of the subTTI index bitmap allocated through DCI or the subTTI index bitmap for each allocated subband. Thus, this modified example has advantages in that signaling of the resource allocation method illustrated in FIG. 17 is possible.

In a simplified method, a method for allowing the BS to perform signaling of the start OFDM index, the duration, and the allocated subband index bitmap through DCI may be used. In this case, the RB may be decided only by the subband index, and PDSCH resources may be allocated only to some OFDM symbols contained in the RB.

Specifically, according to Scheme 2, a PDSCH start OFDM index may be decided by the position of a scheduling PDCCH. Namely, the PDSCH start OFDM index may start from the OFDM symbol configured to transmit the scheduling PDCCH. Alternatively, the PDSCH start OFDM index may start from the next symbol subsequent to the OFDM symbol configured to transmit the scheduling PDCCH. In this case, a method for allowing the BS to explicitly signal only the duration of a transmitted PDSCH and the allocated subband index bitmap through DCI may be used.

The following description will disclose, as additional structures, the operation for allowing the BS to inform (or signal) the UE of DL/UL data regions.

If the DL data subframe is divided into two subTTIs as shown in FIGS. 9 to 11, the BS may inform the UE of information as to whether PDSCH corresponding to the scheduling DCI is transmitted in a first subTTI through the scheduling DCI, may inform the UE of information as to whether PDSCH corresponding to the scheduling DCI is transmitted in a second subTTI through the scheduling DCI, or may inform the UE of information as to whether PDSCH corresponding to the scheduling DCI is transmitted in all the subframes (i.e., both of two subTTIs) through the scheduling DCI.

In another example, though the scheduling DCI, the BS may inform the UE of information as to whether PDSCH corresponding to the scheduling DCI is transmitted in all the subframes, or may inform the UE of information as to whether PDSCH corresponding to the scheduling DCI is transmitted only in a subTTI. If PDSCH is transmitted only in the subTTI, information as to which subTTI is used for PDSCH transmission may be decided through the OFDM symbol index associated with transmission of the scheduling DCI. As a representative example, as shown in FIG. 11, DCI transmitted at a first PDCCH OFDM symbol may schedule a PDSCH transmitted in the first subTTI, and DCI transmitted at a second PDCCH OFDM symbol may schedule a PDSCH transmitted in the second subTTI.

If the UL data subframe is divided by two subTTIs as shown in FIGS. 12 and 13, the BS may inform the UE of information as to whether PUSCH corresponding to the grant DCI should be transmitted in a first subTTI through the grant DCI, information as to whether PUSCH corresponding to the grant DCI should be transmitted in a second subTTI through the grant DCI, or information as to whether PUSCH corresponding to the grant DCI should be transmitted in all the subframes (i.e., both of two subTTIs) through the grant DCI.

In another example, the BS may inform the UE of information as to whether PUSCH corresponding to a grant DCI should be transmitted in all the subframes through the grant DCI, or may inform the UE of information as to whether PUSCH corresponding to the grant DCI should be transmitted only in the subTTI through the grant DCI. In this case, when PUSCH is transmitted only in the subTTI, information as to which subTTI is used for PUSCH transmission may be decided through the OFDM symbol index associated with transmission of the grant DCI. In a representative example, as shown in FIG. 12, DCI transmitted at the first PDCCH OFDM symbol may indicate permission of PUSCH to be transmitted in the first subTTI, and DCI transmitted from the second PDCCH OFDM symbol may indicate permission of PUSCH to be transmitted in the second subTTI.

3.4. Method for Configuring Control Channel Blind Decoding (BD) Resources

In the first to fourth schemes (Schemes 1 to 4) of the present invention, a resource region capable of being mapped to PDCCH is defined as a control channel element (CCE), and the following six methods may be used as the resource region schemes capable of being mapped to the CCE. FIGS. 22 to 27 illustrate individual examples of the above six methods.

Figure 22:
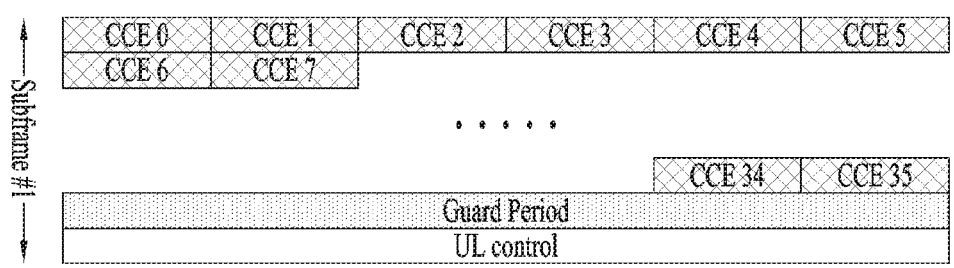
FIG. 22 is a conceptual diagram illustrating a method for mapping a control channel element (CCE) to total time-frequency resources according to an embodiment of the present invention.

FIG. 22 is a conceptual diagram illustrating a method for mapping a control channel element (CCE) to total time-frequency resources according to an embodiment of the present invention.

Figure 23:
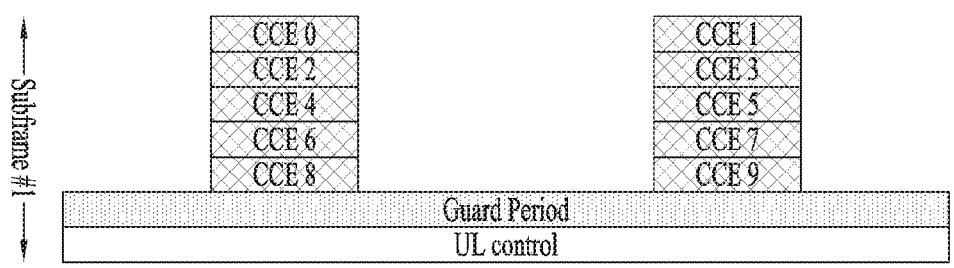
FIG. 23 is a conceptual diagram illustrating a method for mapping a CCE only to designated frequency resources according to an embodiment of the present invention.

FIG. 23 is a conceptual diagram illustrating a method for mapping a CCE only to designated frequency resources according to an embodiment of the present invention.

Figure 24:
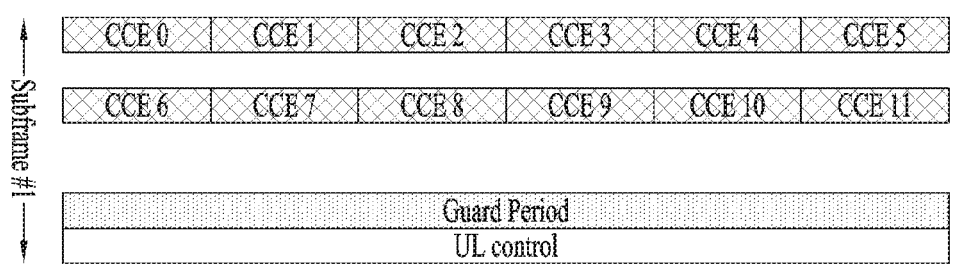
FIG. 24 is a conceptual diagram illustrating a method for mapping a CCE only to designated time resources according to an embodiment of the present invention.

FIG. 24 is a conceptual diagram illustrating a method for mapping a CCE only to designated time resources according to an embodiment of the present invention.

Figure 25:
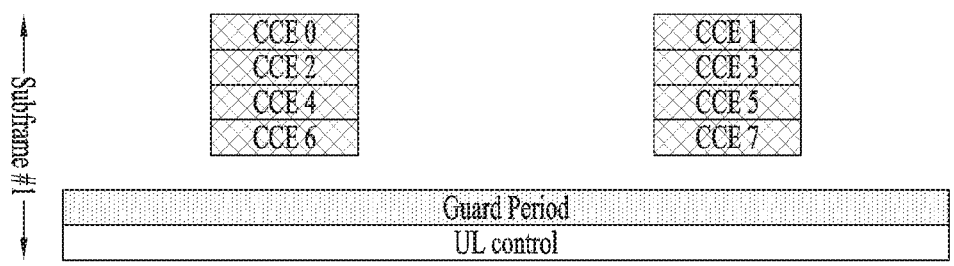
FIG. 25 is a conceptual diagram illustrating a method for mapping a CCE only to designated frequency/time resources according to an embodiment of the present invention.

FIG. 25 is a conceptual diagram illustrating a method for mapping a CCE only to designated frequency/time resources according to an embodiment of the present invention.

Figure 26:
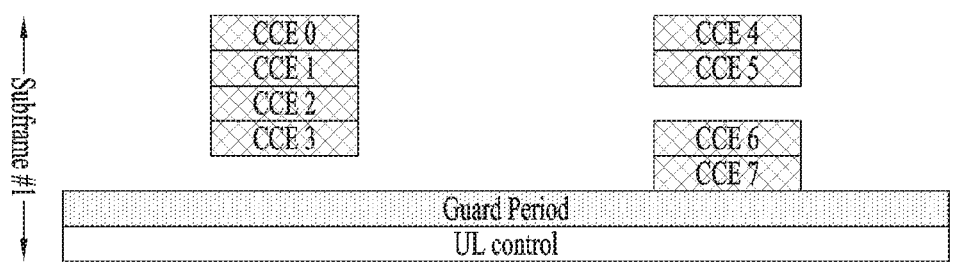
FIG. 26 is a conceptual diagram illustrating a method for designating an OFDM symbol to perform mapping of per-subband CCE according to an embodiment of the present invention.

FIG. 26 is a conceptual diagram illustrating a method for designating an OFDM symbol to perform mapping of per-subband CCE according to an embodiment of the present invention.

Figure 27:
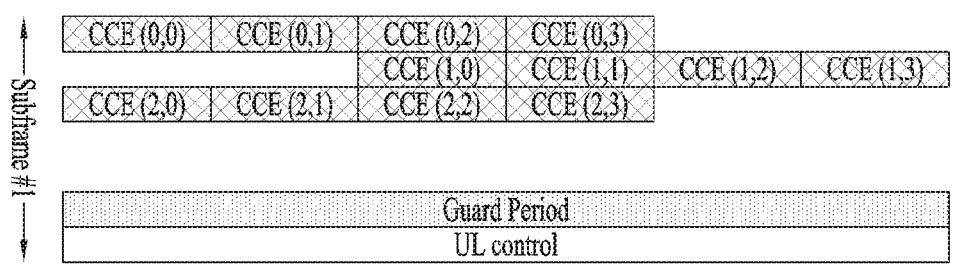
FIG. 27 is a conceptual diagram illustrating a method for designating a subband to perform mapping of per-OFDM-symbol CCE according to an embodiment of the present invention.

FIG. 27 is a conceptual diagram illustrating a method for designating a subband to perform mapping of per-OFDM-symbol CCE according to an embodiment of the present invention.

In this case, the following three methods may be used to perform indexing of the above CCE resources.

(1) Frequency-priority CCE indexing
(2) Time-priority CCE indexing
(3) Two-dimensional (2D) CCE indexing Here, FIGS. 22 to 25 illustrate examples of the frequency-priority CCE indexing method, FIG. 26 illustrates one example of the time-priority CCE indexing method, and FIG. 27 illustrates one example of the 2D CCE indexing method.

In the present invention, DCI may be transmitted through one or more CCEs. In this case, information as to how many CCEs are used for transmission of a single DCI may be defined as an aggregation level (AL). For example, if AL is set to n (AL=n), n may be transmitted through CCE resources.

In the present invention, the following methods may be used to designate CCE resources by which the UE is scheduled to perform BD.

1) UE may perform BD in all the configured CCE resources.

2) UE may perform BD in a predesignated CCE set through RRC signaling. In this case, the CCE set may be decided by the subframe index per subframe. In other words, the CCE region in which the UE performs BD may vary depending on time.

3) CCE set in which the UE is scheduled to perform BD per OFDM symbol may be predesignated.

4) CCE set for BD per AL may be individually designated.

5) CCE set in which the UE is scheduled to perform BD for each subframe set may be separately designated. As a representative example, in most subframes, the UE may perform BD only in a CCE located at a first OFDM symbol, and may perform BD even at a CCE located at the intermediate OFDM symbol of the corresponding subframe only in a subframe configured with a specific duration. As a result, the corresponding subframe may be used to transmit a small packet.

If the UE detects the scheduling DCI and confirms a resource region in which a PDSCH scheduled by the scheduling DCI is transmitted, BD may not be performed in the CCE configured in the corresponding region. Alternatively, if the scheduling DCI is detected, the UE may not perform BD in the CCE to be configured in a subsequent OFDM symbol. For this purpose, the UE may be configured to receive only one PDSCH within only one subframe, and UCI including the UL grant may be configured to be transmitted at a time earlier than the scheduling DCI. In addition, a common DCI may be configured to be transmitted only in a specific OFDM symbol (for example, only in a first OFDM symbol).

In addition, if one subframe is divided by two subTTIs as shown in FIGS. 9 to 13, PDCCH may also be transmitted through a CCE configured in at least two OFDM symbols. FIGS. 9 and 10 illustrate examples in which CCE resources are located not only at a first OFDM symbol of a single subframe but also at the intermediate OFDM symbol of the single subframe. FIGS. 11 to 13 illustrate examples in which CCEs are located at first two OFDM symbols in the time domain of the single subframe.

In this case, the UE may receive a CCE set to be used for BD per OFDM symbol from the BS through RRC signaling. Alternatively, the UE may receive information as to which OFDM symbol will be used for PDCCH BD from the BS through RRC signaling. In this case, all the CCEs configured in the corresponding OFDM symbol are identical to CCEs included in the CCE set for BD.

When one DCI is transmitted through N CCE resources, namely, when DCI is transmitted at AL=n, N CCEs may be located at the same OFDM symbol. Alternatively, a CCE set may be formed per OFDM symbol, and only CCEs contained in each CCE set may be aggregated and then transmitted over a PDCCH.

In FIGS. 11 to 13, the BS may separately designate a CCE set in which BD will be performed per subframe set. As a representative example, the UE may perform BD only in a CCE located at a first OFDM symbol of most of the subframes, and may perform BD in CCEs located at first and second OFDM symbols only during the subframe configured with a specific period, such that it is possible to confirm whether PDSCH has been transmitted on a subTTI basis. In this case, the UE may regard that only a PDSCH of a normal TTI is transmitted in the subframe configured in a manner that BD can be performed only at a CCE located at the first OFDM symbol.

3.5. PDSCH Resource Allocation Method Based on PDCCH Resource Locations

In the first to third schemes (Schemes 1 to 4) of the present invention, although the PDSCH start OFDM symbol index can be explicitly signaled through scheduling DCI, the implicit signaling method to be decided by the transmission (Tx) position of the scheduling PDCCH may also be applied to the present invention as necessary.

FIGS. 28 to 31 illustrate structures in which a DL control channel and a data channel are transmitted according to an embodiment of the present invention.

Figure 28:
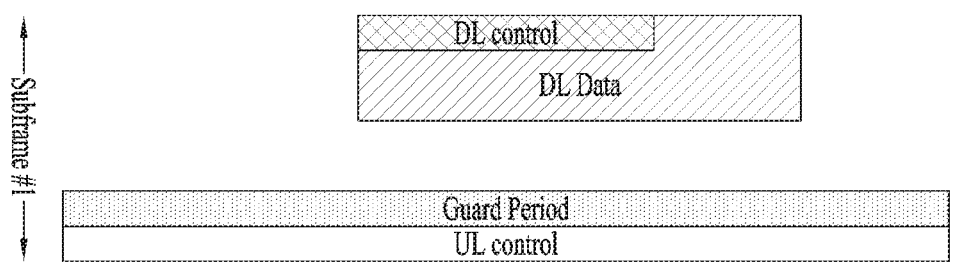
FIGS. 28 to 31 illustrate structures in which a DL control channel and a data channel are transmitted according to an embodiment of the present invention.
Figure 29:
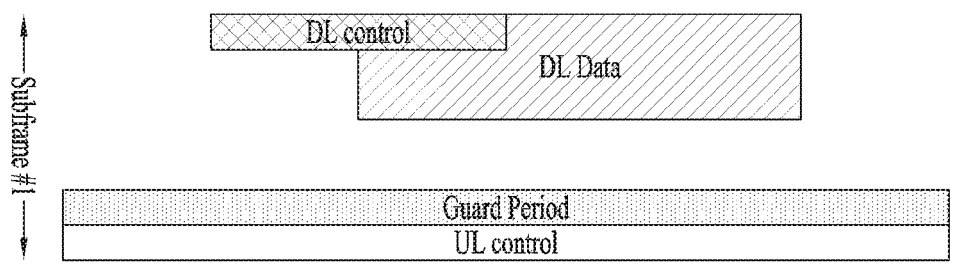
Figure 30:
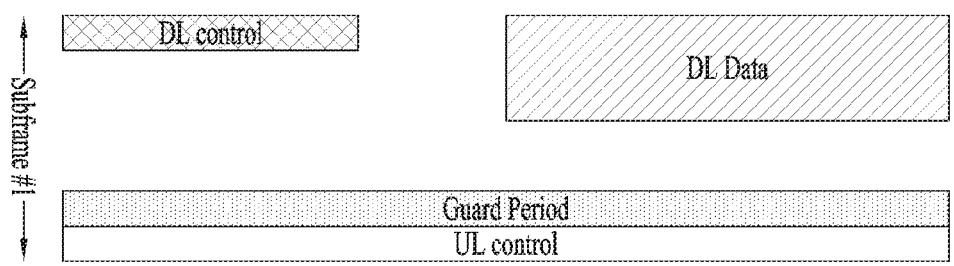
Figure 31:
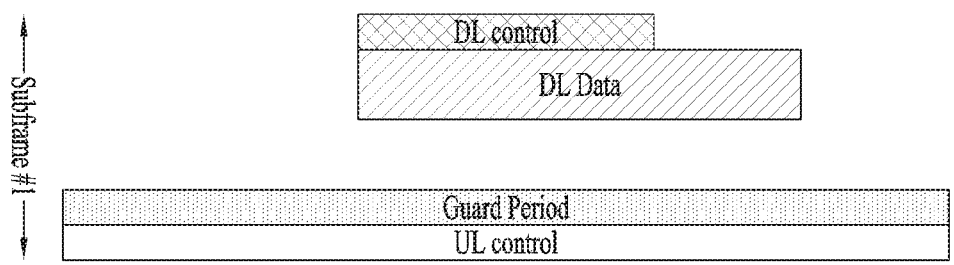

Referring to FIGS. 28 to 30, a PDSCH start OFDM symbol may include an OFDM symbol configured to transmit a scheduling PDCCH, and PDSCH may be transmitted in the time period starting from the OFDM symbol. Alternatively, as shown in FIG. 31, the PDSCH start OFDM symbol may be transmitted in the time domain of an OFDM symbol subsequent to the OFDM symbol used to transmit the scheduling PDCCH, as shown in FIG. 31. In this case, the BS may explicitly signal the UE of only both the PDSCH duration (or the last OFDM symbol index used for PDSCH transmission) and the allocated subband index bitmap through the scheduling DCI.

If a subband through which the scheduling DCI is transmitted is partially identical to or overlaps a PDSCH transmission (Tx) subband corresponding to the subband, PDSCH may be transmitted in the remaining regions other than a resource region in which the scheduling DCI is transmitted, within the scheduled region as shown in FIGS. 28 and 29.

Alternatively, if a subband in which the scheduling DCI is transmitted and the PDSCH Tx subband corresponding to the subband are different from each other (or do not overlap each other), PDSCH may be transmitted from the time region corresponding to the OFDM symbol in which the scheduling PDSCH is transmitted as shown in FIG. 30. In addition, if a subband in which the scheduling DCI is transmitted is partially identical to (or partially overlaps) the PDSCH Tx subband corresponding to the subband, PDSCH may be transmitted from the time domain corresponding to an OFDM symbol subsequent to the OFDM symbol in which the scheduling PDCCH is transmitted, as shown in FIG. 31. In this case, the size of a subband in which PDCCH is transmitted may be less than or equal to the size of a subband in which PDSCH is transmitted.

In addition, the present invention provides a method for indicating an OFDM symbol through which PDSCH (or PUSCH) is transmitted according to a scheme for dividing a single subframe using two subTTIs, as shown in FIGS. 9 to 13. The following description will disclose an example in which respective indexes are respectively set to 1 to 14 in 14 OFDM symbols contained in a single subframe.

In FIGS. 9 and 10, a scheduling DCI transmitted by the BS may designate only the last index of the Tx OFDM symbol (OS) of a PDSCH corresponding to the scheduling DCI. In this case, PDSCH corresponding to the scheduling DCI transmitted in the first CCE set may start transmission from an OS index 2, and PDSCH corresponding to a scheduling DCI transmitted in the second CCE set may start transmission from an OS index 9 (in case of FIG. 9) or from an OS index 9 (in case of FIG. 10). In this case, PDSCH corresponding to the scheduling DCI transmitted in the first CCE set may finish transmission at any one of an OS index 7 (or OS index 6 in case of FIG. 10), an OS index 12, and an OS index 14. The BS may inform the UE of information as to which OS is used to finish PDSCH transmission through DCI. Transmission of PDSCH corresponding to the scheduling DCI transmitted in the second CCE set may be ended at the OS index 12 or 14, and the BS may inform the UE of information as to which OS is used to finish PDSCH transmission through DCI.

In FIGS. 11 to 13, the scheduling DCI (or grant DCI) transmitted by the BS may indicate the start index and the last index of the OFDM symbol configured to transmit the corresponding PDSCH (or PUSCH). In this case, the start index and the last index, that are capable of being designated by DCI transmitted in the respective CCE sets may be configured as shown in Table 4.

Alternatively, since not all the start indexes and not all the last indexes can be combined, the Tx format may be defined by available combinations shown in Table 5, and the BS may inform the UE of information as to which format is used for PDSCH transmission or information as to which format will be used for PUSCH transmission of the UE. In this case, the Tx format may be defined as the start OS index and the last OS index as shown in Table 5, or may be defined as the start OS index or the Tx duration. The scheme for indicating the Tx OFDM symbols of PDSCH and PUSCH using the above Tx formats may also be applied to a general scheme in which the single subframe is used as a normal TTI.

TABLE 4

| | Start OS index | Last OS index |
|---|---|---|
| CCE set1 for PDCCH1 | 2, 3 | 7 (or 8 in FIG. 13), 12, 14 |
| CCE set2 for PDCCH2 | 8 (or 9 in FIG. 13) | 12, 14 |

TABLE 5

| | Transmission (Tx) format [Start OS index, Last OS index] |
|---|---|
| CCE set1 for PDCCH1 | [2, 12], [2, 14], [3, 7] (or [3, 8] in case of FIG. 13) |
| CCE set2 for PDCCH2 | [8, 12], [8, 14] (or [9, 12] and [9, 14] in FIG. 13) |

In Table 5, differently from the method in which the PDSCH (or PUSCH) Tx format is promised between the BS and the UE in advance, the BS may inform the UE of the set of Tx formats through RRC signaling, and may inform the UE of either information as to which format from among the corresponding sets is used for PDSCH transmission through DCI or information as to whether PUSCH should be transmitted. In this case, the BS may independently inform the UE of the set of the PDSCH or PUSCH Tx formats according to individual subframe sets. The above-mentioned scheme may have high utility when the subframes through which PDSCH can be transmitted on a subTTI basis are restricted. In addition, the above-mentioned scheme may also be efficiently available even in the case where a maximum number of PDSCH Tx OFDM symbols is changed according to individual subframe sets.

Alternatively, as described in the above paragraph 3.4, when the UE receives a plurality of CCE sets and BD for PDCCH is performed in each CCE set, the BS may independently inform the UE of the set of PDSCH or PUSCH Tx formats according to individual CCE sets, such that the UE can differently interpret the PDSCH or PUSCH Tx format field of DCI per CCE set.

In the above-mentioned scheme, in order for the UE to interpret the scheduling DCI for PDSCH and the Tx format field of the grant DCI for PUSCH in different ways, the BS may independently inform the UE of the set of PDSCH formats and the set of PUSCH Tx formats.

3.6. DM-RS (Demodulation-Reference Signal) Design (DM-RS Design)

The following three schemes may be used as DM-RS for receiving PDSCH transmitted as shown in the aforementioned methods.

(1) Reference Signal (RS) resources for all OFDM symbols are configured (2) RS resources are configured only for the start OFDM symbol of each PDSCH or only for the $2^{nd}$ start OFDM symbol of each PDSCH.

(3) RS resources are configured only for OFDM symbols spaced apart from each other at intervals of a predetermined distance within each PDSCH Tx region.

As a representative method for configuring RS resources for all OFDM symbols, a method for transmitting only one RS (Reference Signal) RE at intervals of 8 data REs may be used. According to the above scheme, the same RS overhead can be obtained irrespective of information as to how many OFDM symbols are used for PDSCH transmission.

In contrast, the scheme for transmitting DM RS only to a specific OFDM symbol is characterized in that a total RS overhead ratio is changed according to the number of OFDM symbols to be used for PDSCH transmission.

DM-RS for PDCCH and DM-RS for PDSCH may be shared. To this end, a PDCCH Tx subband should be decided in the PDSCH Tx subband set. That is, PDCCH should be transmitted in some subbands from among PDSCH Tx subbands. If PDSCH is transmitted at a high rank, namely, if data is transmitted through a plurality of layers and DM-RS corresponding to the data is then transmitted through the respective layers, the corresponding scheduling PDCCH may be transmitted through a specific layer (e.g., a first layer).

In contrast, DM-RS for PDCCH and DM-RS for PDSCH may be transmitted individually. In this case, PDCCH may be transmitted using a Space Frequency Block Coding (SFBC) scheme, and PDSCH may be transmitted using the precoding Tx scheme based on UE feedback. In this case, even when CSI feedback impairment is large, control information can be stably transmitted.

Figure 32:
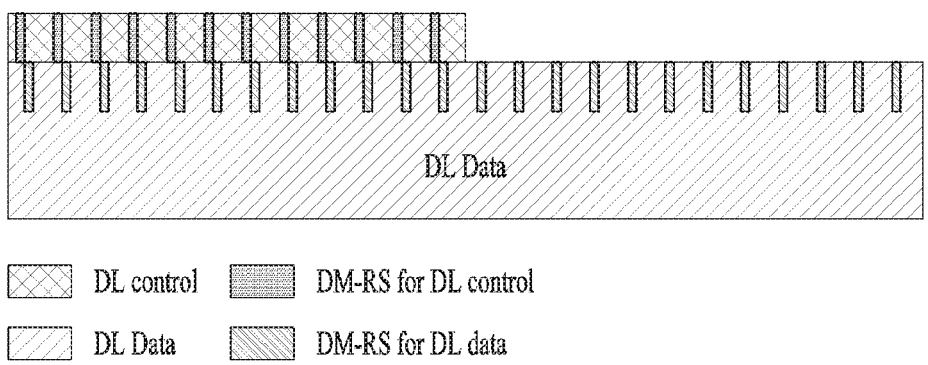
FIGS. 32 to 34 are conceptual diagrams illustrating a method for transmitting a DM-RS according to an embodiment of the present invention.
Figure 33:
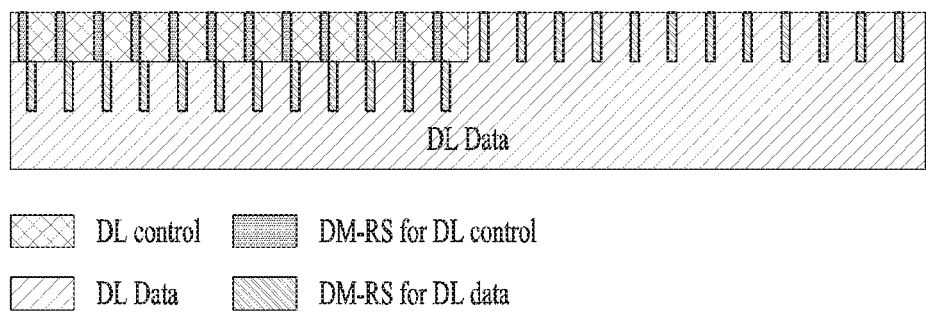
Figure 34:
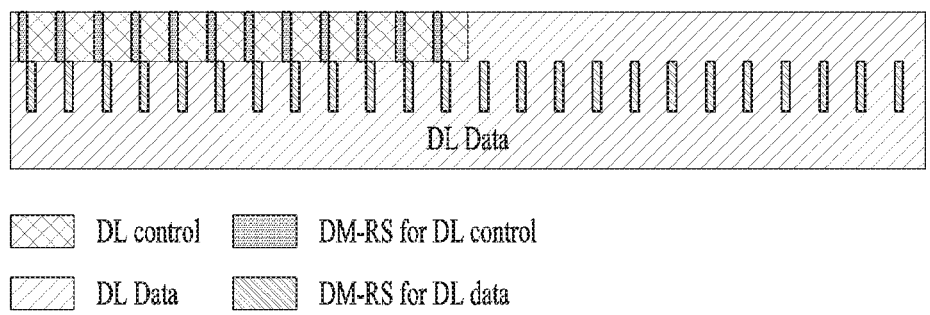

FIGS. 32 to 34 are conceptual diagrams illustrating a method for transmitting a DM-RS according to an embodiment of the present invention.

In more detail, FIG. 32 shows one example in which RS is transmitted only in the PDSCH start OFDM symbol. In this case, DM-RS for PDCCH and DM-RS for PDSCH may be individually transmitted as shown in FIG. 32.

FIGS. 33 and 34 illustrate examples of a transmission (Tx) pattern of the DM-RS for PDSCH when some parts of resources allocated to PDSCH are used to transmit the scheduling PDCCH. Specifically, FIG. 33 is a conceptual diagram illustrating a method for transmitting DM-RS at a first OFDM symbol used for PDSCH per subband, and FIG. 34 is a conceptual diagram illustrating a method for transmitting PDSCH at the next symbol of an OFDM symbol used for PDCCH transmission.

3.7. ACK/NACK Feedback

Transmission (Tx) resources of ACK/NACK feedback to a narrow-time PDSCH that is transmitted only during some time within the subframe proposed by the present invention may be decided by the OFDM symbol used for PDSCH transmission. In more detail, Tx resources of the ACK/NACK feedback may be decided by the following schemes (1) to (4).

(1) A control channel index, namely, ACK/NACK feedback Tx resources, may be linked to the CCE index.

(2) PDSCH Tx resource index, namely, ACK/NACK feedback Tx resources, may be linked to the RB index.

(3) ACK/NACK feedback Tx resources may be designated by information contained in DCI.

(4) ACK/NACK feedback Tx resources may be pre-configured for each UE through RRC signaling.

In the first method (1), the control channel index may be decided by the position of a PDCCH Tx OFDM symbol. Thus, the Tx resources of ACK/NACK feedback may be decided by the position of the Tx OFDM symbol of PDCCH.

In the second method (2), the PDSCH Tx resource index may be decided by the position of the Tx OFDM symbol of PDSCH. Thus, the ACK/NACK feedback Tx resources may be decided by the position of the Tx OFDM symbol of PDSCH.

In addition, the position of a subframe used to transmit the ACK/NACK feedback for PDSCH may be decided by the position of an OFDM symbol in which PDSCH transmission is ended. For example, if the subframe is composed of 14 OFDM symbols and PDSCH is ended before or at the N-th symbol (typically, before or at the 10-th OFDM symbol), ACK/NACK for the corresponding PDSCH may be fed back in a UL control region of the same subframe. If the corresponding PDSCH is ended after the N-th symbol, ACK/NACK for the corresponding PDSCH may be fed back in a UL control region of the next subframe.

In summary, the above-mentioned characteristics of the present invention may include the following structures.

A base station (BS) may transmit and receive signals to and from one or more UEs. Specifically, the BS may transmit a DL control channel and a plurality of DL data channels within a single subframe. In this case, the plurality of DL data channels may be TDM-transmitted.

For example, the BS may transmit the DL control channel at a time earlier than the plurality of DL data channels in the time domain, associated detailed description has already disclosed in FIGS. 7, 9, 10, 11, 14 to 21, 31 and 32, and as such a detailed description thereof will herein be omitted for convenience of description.

In another example, the BS may transmit some of the plurality of DL data channels from a specific time at which the DL control channel is transmitted, associated detailed description has already been disclosed in FIGS. 8, 29, 30, 33, and 34, and as such a detailed description thereof will herein be omitted for convenience of description.

In this case, there may be a plurality of DL control channels as shown in FIGS. 8 to 11. In this case, the plurality of DL control channels may respectively correspond to the plurality of DL data channels.

Specifically, as shown in FIG. 9, if the single subframe includes two slots, the BS may transmit a DL control channel and a DL data channel corresponding to the DL control channel in the same slot.

In addition, DM-RS for the DL control channel and DM-RS for the plurality of DL data channels may be shared. Alternatively, DM-RS for the DL control channel and DM-RS for the plurality of DL data channels may also be transmitted individually.

In addition, the BS may receive a reception (Rx) acknowledgement (ACK) response to a single DL data channel from among the plurality of DL data channels from a specific UE. In this case, the position of a subframe at which the reception (Rx) acknowledgement (ACK) response is transmitted may be decided on the basis of a specific time at which transmission of the single DL data channel is ended.

For example, if the subframe includes 14 symbols and the single DL data channel finishes transmission before or at the K-th symbol (where K is a natural number) from among the 14 symbols, the BS may receive the Rx acknowledgement (ACK) response from the specific UE in the subframe used for transmission of the DL data channel. In other words, if reception of the DL data channel is ended before or at the K-th symbol, the specific UE may transmit the corresponding Rx acknowledgement (ACK) response to the BS through the subframe used for transmission of the DL data channel.

In another example, if the subframe includes 14 symbols and the single DL data channel finishes transmission after the K-th symbol (where K is a natural number) from among the 14 symbols, the BS may receive the Rx acknowledgement (ACK) response from the specific UE in a subframe subsequent to the above subframe used for transmission of the DL data channel. In other words, if reception of the DL data channel is ended after the K-th symbol, the specific UE may transmit the corresponding Rx acknowledgement (ACK) response to the BS through a subframe subsequent to the subframe used for transmission of the DL data channel.

4. Device Configuration

Figure 35:
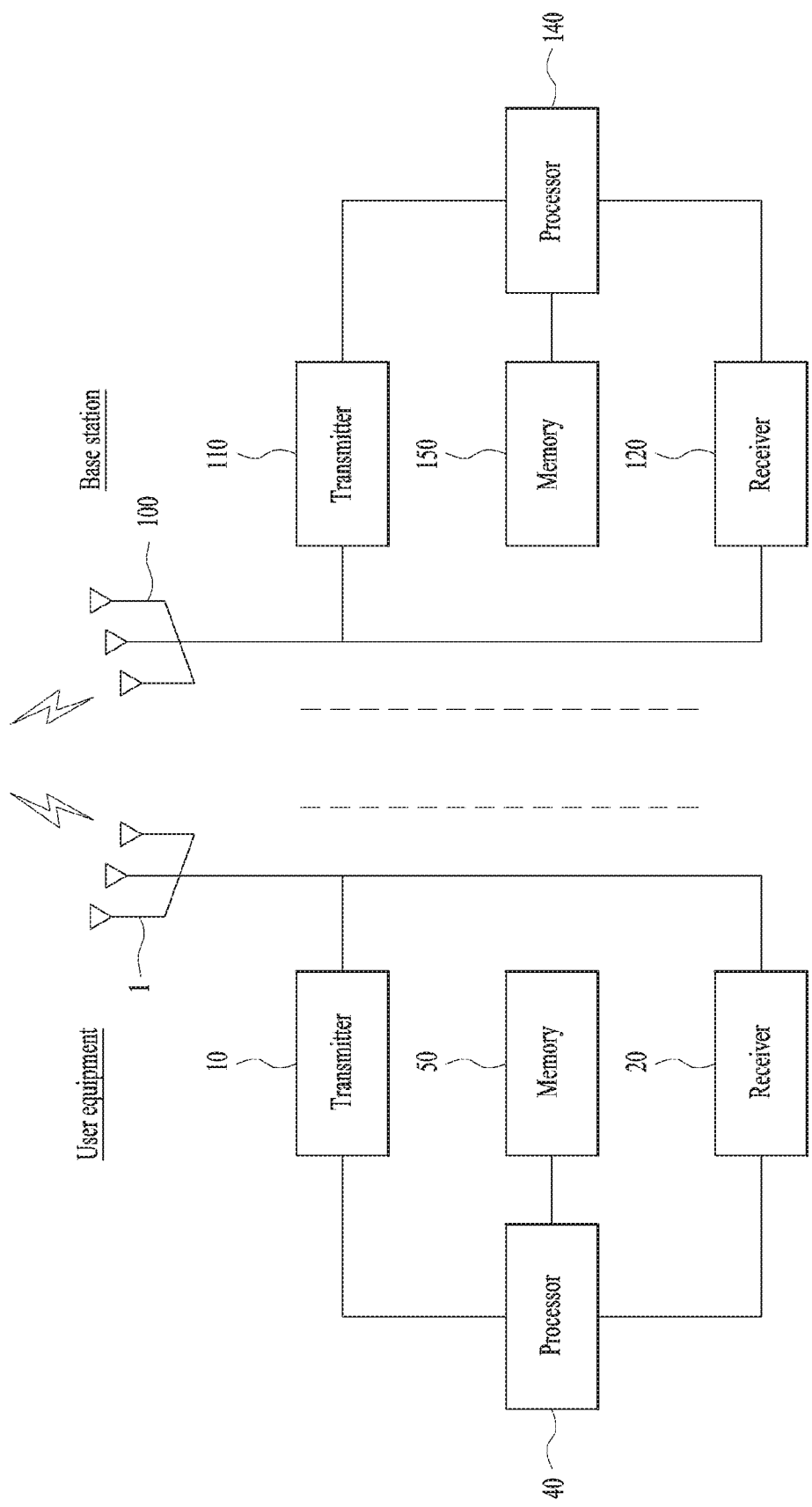
FIG. 35 is a diagram illustrating a configuration of a user equipment (UE) and a base station (BS) in which the proposed embodiments may be implemented.

FIG. 35 is a diagram illustrating configurations of a UE and a base station (BS) capable of being implemented by the embodiments proposed in the present invention. The UE and the base station (BS) shown in FIG. 35 operate to implement the embodiments of the method for transmitting and receiving signals between the UE and the BS.

A UE 1 may act as a transmission end on a UL and as a reception end on a DL. A base station (eNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

The above-mentioned user equipment (UE) may receive first DL control information indicating whether the type of scheduling UL signal transmission for at least one subframe is first-type scheduling or second-type scheduling from the base station through the processor 40. If the first DL control information indicates the first-type scheduling, the UE may transmit the UL signal in at least one subframe configured based on the reception (Rx) time of the first DL control information. If the first DL control information indicates the second-type scheduling, the UE may receive the second DL control information for indicating UL signal transmission for the at least one subframe from the base station, and may transmit the UL signal in at least one subframe configured based on the Rx time of the second DL control information.

The above-mentioned base station (BS) may transmit first DL control information indicating whether the type of scheduling UL signal transmission for at least one subframe is first-type scheduling or second-type scheduling to the user equipment (UE) through the processor 140. If the first DL control information indicates the first-type scheduling, the base station (BS) may receive the UL signal in at least one subframe configured based on the transmission (Tx) time of the first DL control information. If the first DL control information indicates the second-type scheduling, the BS may transmit the second DL control information for indicating UL signal transmission for the at least one subframe to the user equipment (UE), and may receive the UL signal in at least one subframe configured based on the Tx time of the second DL control information.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 35 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 2680 or 2690 and executed by the processor 2620 or 2630. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

What is claimed is:

1. A method for transmitting and receiving signals to and from at least one user equipment (UE) by a base station (BS) in a wireless communication system comprising:
    transmitting a first downlink (DL) control channel and a plurality of downlink (DL) data channels in a single subframe a first DL data channel in a first slot of a single subframe;

transmitting a second DL control channel and a second DL data channel in a second slot of the single subframe; and receiving an acknowledgement (ACK) or Non-ACK (NACK) feedback for the first DL data channel in the single subframe, wherein an ACK or NACK feedback for the second DL data channel is received in the single subframe based on a last symbol index of the second DL data channel being less than a predetermined index, and wherein the first DL data channel and the second DL data channel are TDM (Time Division Multiplexing)-transmitted.

2. The method according to claim 1, wherein the first DL control channel is transmitted earlier than the first DL data channel, and the second DL control channel is transmitted earlier than the second DL data channel.

3. The method according to claim 1, wherein some parts of the first DL data channel are transmitted from a specific time where the first DL control channel is transmitted, and some parts of the second DL data channel are transmitted from a specific time where the second DL control channel is transmitted.

4. The method according to claim 1, wherein:
a demodulation-reference signal (DM-RS) for the first DL control channel and a demodulation-reference signal (DM-RS) for the first DL data channel are shared.

5. The method according to claim 1, wherein:
a demodulation-reference signal (DM-RS) for the first DL control channel and a demodulation-reference signal (DM-RS) for the first DL data channel are transmitted individually.

6. The method according to claim 1, wherein the ACK or NACK feedback for the second DL data channel is transmitted in a subframe next to the single subframe based on a last symbol index of the second DL data channel being greater than or equal to the predetermined index.

7. A method for transmitting and receiving signals to and from at least one base station (BS) by a user equipment (UE) in a wireless communication system comprising:
receiving a first downlink (DL) control channel and a first DL data channel in a first slot of a single subframe;
receiving a second DL control channel and a second DL data channel in a second slot of the single subframe; and
transmitting an acknowledgement (ACK) or Non-ACK (NACK) feedback for the first DL data channel in the single subframe,
wherein an ACK or NACK feedback for the second DL data channel is transmitted in the single subframe based on a last symbol index of the second DL data channel being less than a predetermined index, and
wherein the first DL data channel and the second DL data channel are TDM (Time Division Multiplexing)-transmitted.

8. A base station (BS) for transmitting and receiving signals to and from at least one user equipment (UE) in a wireless communication system comprising:
a transmitter;
a receiver; and
a processor configured to operate by connecting to the transmitter and the receiver,
wherein the processor is configured to:
transmit a first downlink (DL) control channel and a first downlink (DL) data channel in a first slot of a single subframe,
transmit a second DL control channel and a second DL data channel in a second slot of the single subframe,
receiving an acknowledgement (ACK) or Non-ACK (NACK) feedback for the first DL data channel in the single subframe,
wherein an ACK or NACK feedback for the second DL data channel is received in the single subframe based on a last symbol index of the second DL data channel being less than a predetermined index, and
wherein the first DL data channel and the second DL data channel are TDM (Time Division Multiplexing)-transmitted.

9. A user equipment (UE) for transmitting and receiving signals to and from a base station (BS) in a wireless communication system comprising:
a transmitter;
a receiver; and
a processor configured to operate by connecting to the transmitter and the receiver,
wherein the processor is configured to:
receive a first downlink (DL) control channel and a first downlink (DL) data channel, in a first slot of a single subframe, and
receive a second DL control channel and a second DL data channel in a second slot of the single subframe,
transmit an acknowledgement (ACK) or Non-ACK (NACK) feedback for the first DL data channel in the single subframe,
wherein an ACK or NACK feedback for the second DL data channel is received in the single subframe based on a last symbol index of the second DL data channel being less than a predetermined index, and
wherein the first DL data channel and the second DL data channel are TDM (Time Division Multiplexing)-transmitted.

* * * * *